United States Patent
Kim et al.

(10) Patent No.: US 11,641,971 B2
(45) Date of Patent: May 9, 2023

(54) METHOD FOR EXTRACTING COFFEE

(71) Applicant: LG ELECTRONICS INC., Seoul (KR)

(72) Inventors: Jun Ho Kim, Seoul (KR); Min Jung Kim, Seoul (KR); Yoo Jin Choi, Seoul (KR); In Jun Park, Seoul (KR); Sung Jin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 16/701,071

(22) Filed: Dec. 2, 2019

(65) Prior Publication Data

US 2021/0038014 A1 Feb. 11, 2021

(30) Foreign Application Priority Data

Aug. 5, 2019 (KR) .......................... 10-2019-0094957

(51) Int. Cl.
 *A47J 31/00* (2006.01)
 *A47J 31/52* (2006.01)
 (Continued)

(52) U.S. Cl.
 CPC ............. *A47J 31/002* (2013.01); *A23F 5/262* (2013.01); *A47J 31/4475* (2013.01); *A47J 31/525* (2018.08)

(58) Field of Classification Search
 CPC .... A47J 31/002; A47J 31/525; A47J 31/4475; A23F 5/262
 See application file for complete search history.

(56) References Cited

U.S. PATENT DOCUMENTS

| 5,724,882 A | * | 3/1998 | Gallas | ..................... A47J 31/44 426/433 |
| 6,305,258 B1 | * | 10/2001 | Henderson | ............... B26D 5/00 83/72 |

(Continued)

FOREIGN PATENT DOCUMENTS

| KR | 19990065538 | 8/1999 |
| KR | 1020060061319 | 6/2006 |

(Continued)

OTHER PUBLICATIONS

Translation for KR 20130019466 published Feb. 2013.*
Translation for KR 20180076811 published Jul. 2018.*

*Primary Examiner* — Anthony J Weier
(74) *Attorney, Agent, or Firm* — Lee, Hong, Degerman, Kang & Waimey PC

(57) ABSTRACT

According to the present disclosure, when drip coffee is extracted, it may learn drip coffee recipe information of a barista to be imitated and extract the drip coffee based on the learned reference acidity and reference concentration. The extracted drip coffee may be compared with the learned reference acidity and the reference concentration and evaluated, and when the acidity and concentration of the drip coffee are matched with the reference acidity and the reference concentration, the drip coffee having the same acidity and concentration as the drip coffee may be extracted. Alternatively, when the acidity and concentration of the drip coffee are not matched with the reference acidity and the reference concentration, drip coffee having the same or/and similar acidity and concentration as or/and to the reference acidity and the reference concentration may be extracted by changing extraction conditions of the drip coffee through reinforcement learning.

4 Claims, 6 Drawing Sheets

(51) Int. Cl.
*A47J 31/44* (2006.01)
*A23F 5/26* (2006.01)

(56) References Cited

U.S. PATENT DOCUMENTS

| | | | | |
|---|---|---|---|---|
| 2011/0246091 A1* | 10/2011 | Fedele | ............... | G01N 21/4133 356/128 |
| 2016/0055599 A1* | 2/2016 | Illy | ........................ | A47J 31/40 705/15 |
| 2018/0255962 A1* | 9/2018 | Vetterli | ................ | A47J 31/002 |

FOREIGN PATENT DOCUMENTS

| KR | 10-2013-0019466 | 2/2013 |
|---|---|---|
| KR | 10-2018-0076811 | 7/2018 |

\* cited by examiner

[FIG. 1]
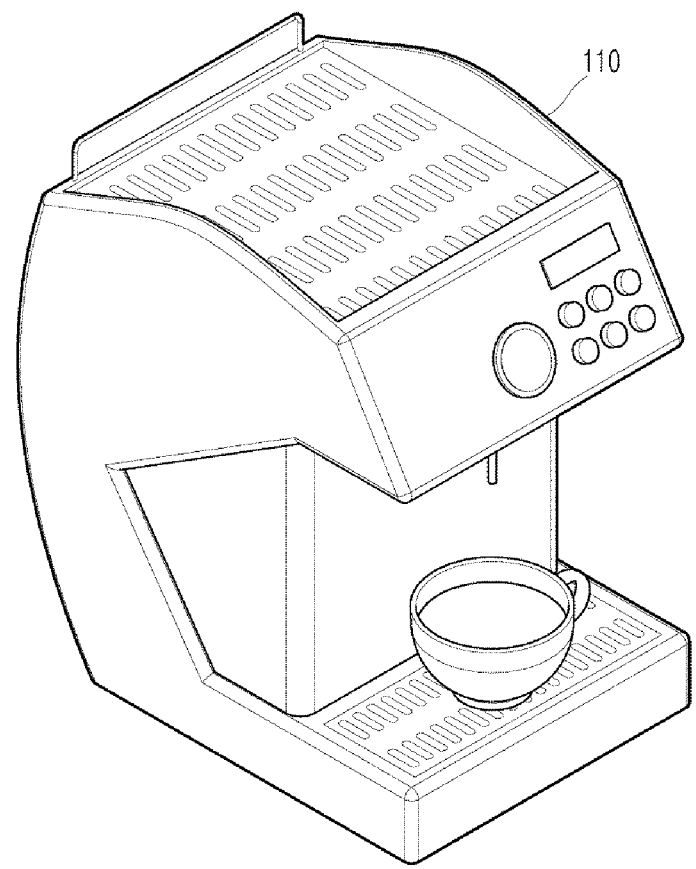

[FIG. 2]
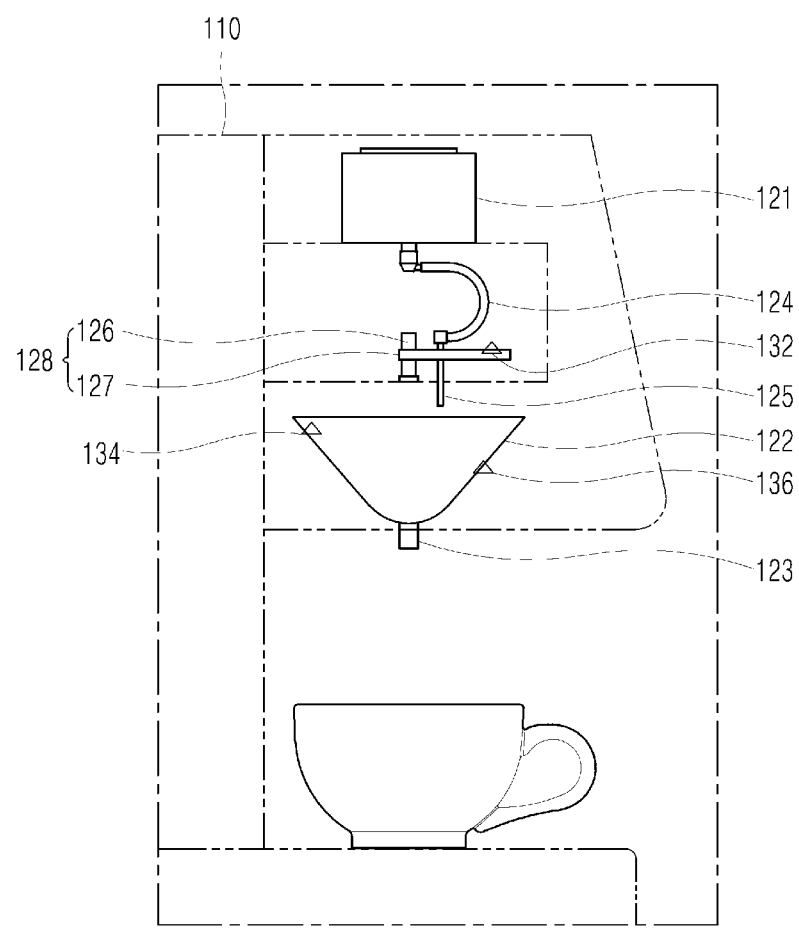

[FIG. 3]
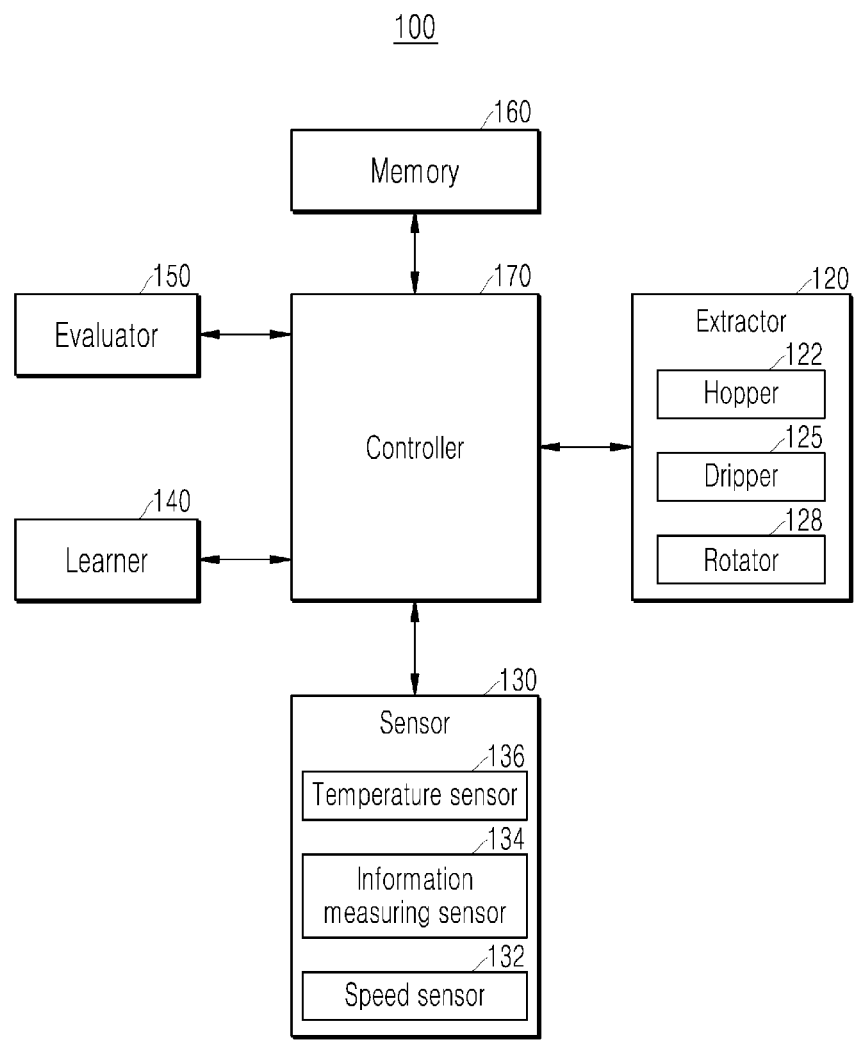

[FIG. 4]
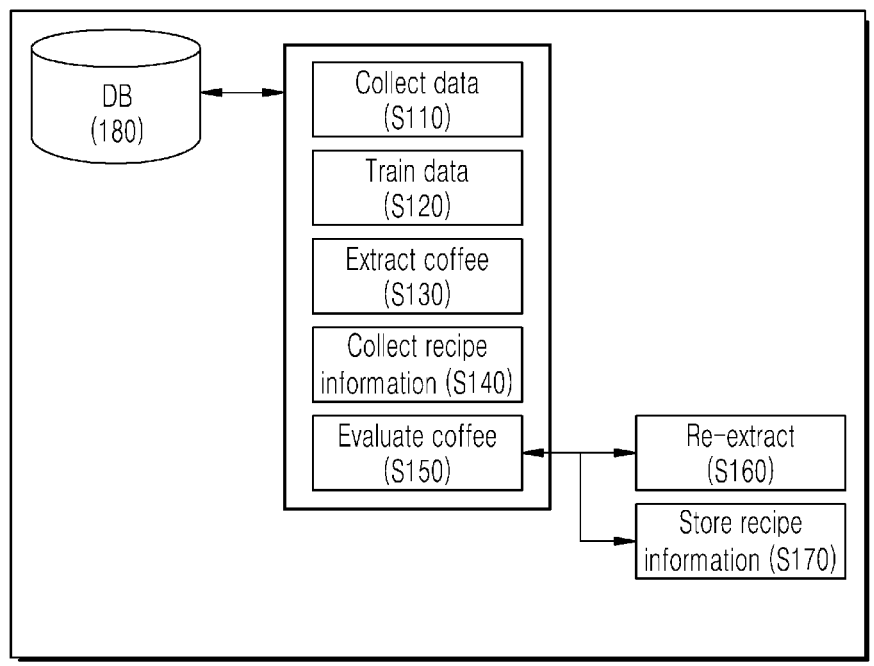

[FIG. 5]
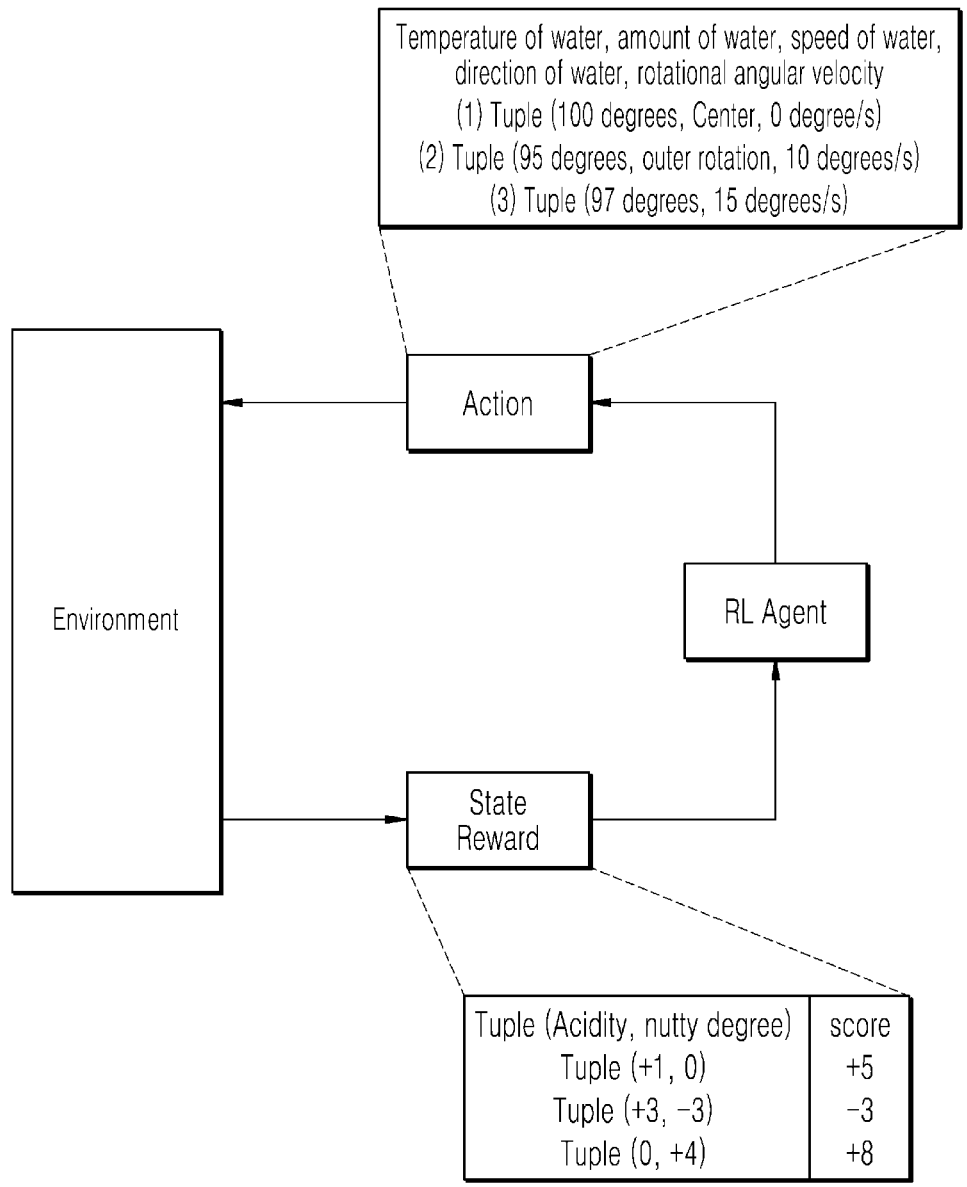

[FIG. 6]
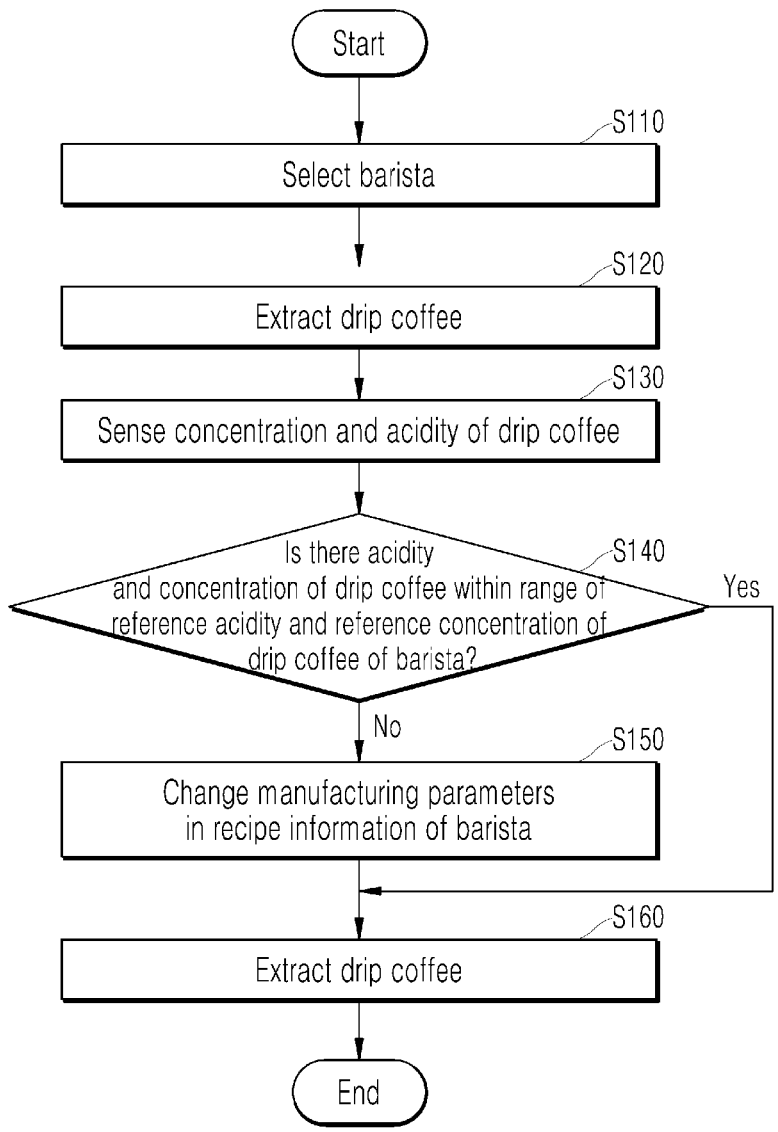

METHOD FOR EXTRACTING COFFEE

CROSS-REFERENCE TO RELATED APPLICATION

Pursuant to 35 U.S.C. § 119(a), this application claims the benefit of earlier filing date and right of priority to Korean Patent Application No. 10-2019-0094957, filed on Aug. 5, 2019, the contents of which are hereby incorporated by reference herein in its entirety.

BACKGROUND

1. Technical Field

The present disclosure relates to a drip coffee machine and a method for manufacturing coffee using the same and more particularly, to a technology of learning a drip coffee recipe of a barista and extracting drip coffee by a reference acidity and a reference concentration corresponding to the drip coffee of the barista to be imitated.

2. Description of Related Art

The following description is only for the purpose of providing background information related to embodiments of the present disclosure, and the contents to be described do not necessarily constitute related art.

Drip coffee is a method of pulverizing coffee beans, pouring water to filter coffee powder, and then extracting only liquid coffee and a method of extracting coffee using a simple tool and a filter according to the intention of a person who extracts coffee (hereinafter, barista) to extract the original taste and aroma as much as possible. Since such drip coffee may best express a coffee producing area or the degree of roasting the coffee beans (roasting degree), it is best used in coffee shops as well as at home.

There are various types of drip tools for extracting drip coffee according to a drip method. Specifically, the most representative method is a method of inserting a paper filter into a dripper, putting the coffee powder in the dripper while placing the dripper on a server, and pouring hot water to extract coffee, in which the water passes through the coffee beans and the filter placed in the dripper to drip the coffee in the server located at the bottom of the dripper. An acidity or concentration of the coffee extracted by the drip method may vary depending on the method of pouring water into the coffee powder or a time of extracting the coffee for each barista.

In particular, since it is difficult for a drinker to extract the coffee in the same manner as the drip method of the barista, the drinker wants to drink the drip coffee according to a preferred drip method of the barista. That is, a technique of learning a coffee extraction method of the barista without directly asking the barista to extract the coffee or visiting the barista is required so that the drinker drinks the coffee according to the learned coffee extraction method of the barista.

As such, as a specific example of the technique capable of extracting the coffee by the preferred drip method of the barista, for example, in a 'hand-drip coffee machine' of Korean Patent Publication No. 10-2013-0019433 (published on Feb. 27, 2013), a spiral screw groove is formed in a dripper that pours water into coffee powder, so that when the water is poured into the coffee powder, the water may be rotated and poured.

The 'hand-drip coffee machine' discloses a technique that can extract coffee containing rich aroma and taste because a barista may pour water into the coffee powder by controlling the linear motion and the rotational motion of the dripper to extract coffee.

However, the 'hand-drip coffee machine' does not specifically disclose a technique of learning a coffee extraction method of the barista without directly asking the barista to extract the coffee or visiting the barista, thereby being able to drink the coffee according to the learned coffee extraction method of the barista.

In addition, according to the 'manufacturing method of drip coffee' disclosed in Korean Patent Publication No. 10-2018-0076811 (published on Jul. 6, 2018), it suggests a technique of modifying and updating a recipe according to a user's taste evaluation and storing a recipe optimized to the user to be capable of enjoying the drip coffee with each recipe.

In the 'manufacturing method of drip coffee', it may provide drip coffee suitable for each user by extracting the drip coffee as directed in recipe according to the taste and aroma desired by the user.

In contrast, the disclosed 'manufacturing method of drip coffee' provides the drip coffee suitable for each user, but does not specifically disclose a technique of learning a drip coffee recipe of a specific barista and drinking the coffee according to the learned coffee extracting method of the barista.

Therefore, in order to drink drip coffee of a specific barista, it is required a technique of learning a desired drip coffee recipe of a barista, extracting the drip coffee according to the learned recipe, and evaluating whether the acidity and the concentration of the extracted drip coffee match the acidity and the concentration of the drip coffee of the barista.

The above-described background technology is technical information that the inventors hold for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

An object of the present disclosure is to extract drip coffee through a machine according to a recipe to be similar or equal to a recipe of a drip coffee extracted by a barista.

Another object of the present disclosure is to drink drip coffee extracted by using a drip coffee machine that has learned a drip coffee recipe of a barista without asking the barista to extract coffee directly or visiting the barista.

Yet another object to the present disclosure is to determine whether the acidity and the concentration of extracted drip coffee are out of a range of a reference acidity and a reference concentration corresponding to drip coffee of a barista to be imitated. When the acidity and the concentration of the extracted drip coffee are out of the reference acidity and the reference concentration corresponding to drip coffee of a barista to be imitated, the drip coffee machine may re-extract the coffee by changing manufacturing parameters in recipe information of the barista. As a result, the drip coffee machine may extract drip coffee according to a recipe which is most similar to a barista drip coffee recipe.

An aspect of the present disclosure is not limited to the above-mentioned aspects, and other aspects and advantages of the present disclosure, which are not mentioned, will be understood through the following description, and will become apparent from the embodiments of the present disclosure. In addition, it will be appreciated that the aspects and advantages of the present disclosure will be easily realized by those skilled in the art based on the appended claims and a combination thereof.

A drip coffee machine according to an embodiment of the present disclosure relates to a technology that allows drip coffee extracted by a barista to be extracted and drunk through a coffee machine.

Specifically, a method for manufacturing coffee according to an embodiment of the present disclosure may comprise receiving a selection for a barista to be imitated; extracting drip coffee by recipe information of the barista; sensing at least one of acidity or concentration of the extracted drip coffee; determining whether the at least one of the acidity or the concentration of the extracted drip coffee is within a predetermined range from a reference acidity and a reference concentration of the drip coffee corresponding to the recipe information of the barista; and changing manufacturing parameters in the recipe information of the barista based on a machine learning model when a difference between the acidity and the concentration of the extracted drip coffee and the reference acidity and the reference concentration is out of a predetermined range.

At this time, the machine learning model may be pre-trained to predict an effect of a change in the manufacturing parameters included in the recipe information on the at least one of the acidity or the concentration of the extracted drip coffee.

By extracting the drip coffee in this manner, it may extract the same or similar drip coffee as the drip coffee according to the recipe of the barista to be imitated.

The sensing in the method for manufacturing coffee according to the embodiment of the present disclosure may comprise measuring the acidity and the concentration of the extracted drip coffee and digitizing the measured acidity and the measured concentration of the extracted drip coffee.

That is, the acidity and concentration of the extracted drip coffee may be measured to compare a component of the drip coffee of the barista to be imitated and a component of the extracted drip coffee. In this case, when the extracted drip coffee is different from the drip coffee of the barista to be imitated in acidity or concentration, the method of extracting the drip coffee may be changed. As a result, it may extract a drip coffee component similar to or the same as the drip coffee component of the barista to be imitated.

In the changing of the manufacturing parameters in the recipe information of the barista of the method for manufacturing coffee according to the embodiment of the present disclosure, when water is supplied to the coffee powder for extracting the drip coffee, at least one manufacturing parameter of a water supply speed, a temperature of the water, an amount of water or a spray angle of the water sprayed toward the coffee powder may be changed.

Specifically, in order to change the taste and aroma of the drip coffee, the drip coffee may be extracted by changing a method of supplying water to the coffee powder.

The method for manufacturing coffee according to the embodiment of the present disclosure may comprise re-extracting the drip coffee by the recipe information having the changed the manufacturing parameters, after changing the manufacturing parameters in the recipe information of the barista.

That is, in order to extract the drip coffee that matches the reference acidity and the reference concentration of the drip coffee of the barista to be imitated, the coffee may be re-extracted by changing the method of supplying water to the coffee powder. Through this process, the drip coffee to be extracted may be learned by the drip coffee machine to be the same as or/and similar to the drip coffee of the barista to be imitated.

The determining of whether the at least one of the acidity or the concentration of the extracted drip coffee is within the predetermined range of the method for manufacturing coffee according to the embodiment of the present disclosure may comprise storing a drip method of extracting the drip coffee when it is determined that at least one of the acidity or the concentration of the extracted drip coffee is within the reference acidity and the reference concentration of the drip coffee corresponding to the recipe information of the barista.

That is, when the acidity and the concentration of the extracted drip coffee match the reference acidity and the reference concentration of the drip coffee of the barista to be imitated, a coffee drinker who uses the machine may drink drip coffee the same as or similar to the drip coffee of the barista to be imitated by storing and learning the method of extracting the extracted drip coffee.

A drip coffee machine according to an embodiment of the present disclosure may comprise a coffee machine main body, an extractor provided in the main body and configured to extract drip coffee by recipe information of a barista to be imitated, a sensor configured to sense at least one of acidity or concentration of the extracted drip coffee, a memory stored with a computer readable program configured to determine whether the at least one of the acidity or the concentration of the extracted drip coffee is within a predetermined range from a reference acidity and a reference concentration of the drip coffee corresponding to the recipe information of the barista, and a controller configured to control the extractor by communicating with the memory and the sensor.

At this time, the memory may store a machine learning model which is pre-trained to predict an effect of a change in the manufacturing parameters included in the recipe information on the at least one of the acidity or the concentration of the extracted drip coffee.

Further, the controller may be configured to change manufacturing parameters in the recipe information of the barista based on the machine learning model when a difference between the acidity and the concentration of the extracted drip coffee and the reference acidity and the reference concentration is out of a predetermined range.

Therefore, it may drink drip coffee extracted by using a drip coffee machine that has learned a drip coffee recipe of a barista without asking the barista to be imitated to extract coffee directly or visiting the barista.

In addition, by comparing the acidity and the concentration of the extracted drip coffee with respect to the reference acidity and the reference concentration of the drip coffee of the barista to be imitated, it may be capable of determining whether the taste and aroma and etc. of the extracted drip coffee match the taste and aroma of the drip coffee of the barista to be imitated.

In this case, when the at least one of the acidity or the concentration of the extracted drip coffee is not determined to be within the reference acidity and the reference concentration of the drip coffee corresponding to the recipe information of the barista, the drip coffee may be re-extracted by changing conditions (e.g., a water amount, a water temperature, etc.) for extracting the drip coffee. Through this process, it may extract the drip coffee that is most similar to the drip coffee of the barista to be imitated.

The sensor of the drip coffee machine according to the embodiment of the present disclosure may include an information measuring sensor which numerically measures the acidity and the concentration of the extracted drip coffee.

That is, it may drink the drip coffee similar to or the same as the drip coffee of the barista to be imitated by measuring whether the acidity and the concentration of the extracted drip coffee match up with or are within a predetermined range of the reference acidity and the reference concentration corresponding to the drip coffee of the barista.

The extractor of the drip coffee machine according to the embodiment of the present disclosure may comprise a hopper for accommodating powder in which coffee powder is accommodated, a dripper configured to supply water to the coffee powder while rotating clockwise or counterclockwise from the upper side of the hopper, and a rotator configured to control the rotation of the dripper to control conditions for supplying water to the hopper.

Further, the sensor of the drip coffee machine according to the embodiment of the present disclosure may further comprise a volume sensor configured to sense a height of the water supplied to the hopper from the dripper and a speed sensor configured to measure a supply speed of the water supplied to the hopper from the dripper.

That is, it may more accurately measure conditions for supplying water to the coffee powder to extract the drip coffee. According to a change in the method of supplying the water, when it is determined whether the acidity and the concentration of the drip coffee re-extracted and the reference acidity and the reference concentration of the drip coffee corresponding to the recipe information of the barista to be imitated are within a predetermined range, the conditions may be a criterion.

Specifically, when water is supplied to the coffee powder for extracting the drip coffee, the controller of the drip coffee machine according to the embodiment of the present disclosure may change at least one manufacturing parameter of a water supply speed, a temperature of the water, an amount of water or a spray angle of the water sprayed toward the coffee powder.

That is, when the acidity and the concentration of the extracted drip coffee are out of the reference acidity and the reference concentration corresponding to the drip coffee of the barista to be imitated, the coffee may be re-extracted by changing the method of supplying water to the coffee powder. Through this process, the drip coffee to be extracted may be the same as or/and similar to the drip coffee of the barista to be imitated.

The memory of the drip coffee machine according to the embodiment of the present disclosure may store a drip method of extracting the drip coffee when it is determined that at least one of the acidity or the concentration of the extracted drip coffee is within the reference acidity and the reference concentration of the drip coffee corresponding to the recipe information of the barista.

That is, when the acidity and the concentration of the extracted drip coffee match the reference acidity and the reference concentration of the drip coffee of the barista to be imitated, a coffee drinker who uses the machine may drink drip coffee the same as or similar to the drip coffee of the barista to be imitated by storing and learning the method of extracting the extracted drip coffee.

Other aspects and features than those described above will become apparent from the following drawings, claims, and detailed description of the present disclosure.

According to the present disclosure, it may extract drip coffee by adjusting a temperature, a spraying speed, a rotational speed, and the like of water supplied to coffee powder to be extracted into the drip coffee according to the reference acidity and the reference concentration corresponding to the drip coffee of the barista to be imitated. Since the drip coffee may be extracted according to the temperature, the supply speed, and the like of the water, the drip coffee can be extracted without departing from a range of the reference acidity and the reference concentration corresponding to the drip coffee of the barista to be imitated.

Further, according to an embodiment of the present disclosure, it may extract acidity, concentration, etc. of the extracted drip coffee. The acidity and the concentration of the extracted drip coffee may be compared with the reference acidity and the reference concentration corresponding to the drip coffee of the barista to be imitated. That is, it may more objectively determine whether the extracted drip coffee is drip coffee that is equal or similar to the drip coffee of the barista to be imitated.

According to an embodiment of the present disclosure, it may extract drip coffee that is equal or/and similar to the drip coffee extracted by the barista to be imitated through the drip coffee machine. Therefore, the drinker may drink drip coffee extracted according to a drip coffee recipe of a barista.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a diagram illustrating a drip coffee machine according to an embodiment of the present disclosure;

FIG. 2 is a diagram illustrating a cross section of the drip coffee machine of FIG. 1;

FIG. 3 is a schematic block diagram of the drip coffee machine according to an embodiment of the present disclosure;

FIG. 4 is a block diagram for describing an operation of the drip coffee machine according to an embodiment of the present disclosure;

FIG. 5 is an exemplary diagram for describing an operation of the drip coffee machine according to an embodiment of the present disclosure; and FIG. 6 is a flowchart for describing an operation of the drip coffee machine according to an embodiment of the present disclosure.

DETAILED DESCRIPTION

Hereinafter, the present disclosure will be described in more detail with reference to the drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, a drip coffee machine of the present disclosure will be described in detail with reference to the drawings.

FIG. 1 is a diagram illustrating a drip coffee machine according to an embodiment of the present disclosure and FIG. 2 is a diagram illustrating a cross section of the drip coffee machine of FIG. 1.

Although a drip coffee machine 100 according to the embodiment of the present disclosure is a device that can automatically extract drip coffee according to the reference acidity and the reference concentration corresponding to drip coffee of a barista to be imitated, the drip coffee machine may be operated in a semi-automatic or manual mode in addition to the automatic extraction.

The drip coffee machine 100 according to the embodiment of the present disclosure refers to a device that can mechanically extract drip coffee by pulverizing coffee beans, pour water, filter coffee powder, and extract only liquid coffee.

In order to extract the drip coffee from the drip coffee machine 100, the drip coffee machine 100 may be configured to learn and store the reference acidity and the reference concentration corresponding to the drip coffee of the barista to be imitated.

Specifically, the reference acidity and the reference concentration corresponding to the drip coffee of the barista to be imitated may be the concentration and the acidity of a drip coffee extracted by baristas who have won awards at various barista competitions such as Specialty Coffee Association (SCA), World Coffee Events (WCE), and World Barista Championship (WBC). Alternatively, the reference acidity and the reference concentration may also be the concentration and the acidity of a drip coffee extracted from a particular coffee shop. In the following description, the reference acidity and the reference concentration corresponding to the drip coffee of the barista to be imitated will be described as the acidity and the concentration of the drip coffee extracted by the barista to be imitated.

The drip coffee machine 100 of the embodiment of the present disclosure may be configured to learn recipe information of a specialized barista. In detail, in the drip coffee, the acidity, the concentration, and the like of the coffee may be changed according to various conditions such as a spray height and a spray angle of water sprayed toward the coffee powder, an amount of coffee powder, an amount of water poured into the coffee powder, and the like. The acidity, the concentration, and the like of the coffee may be referred to as the reference acidity and the reference concentration, and the drip coffee machine 100 according to the embodiment of the present disclosure may learn the reference acidity and the reference concentration of the drip coffee corresponding to the recipe information of the barista to be imitated and extract drip coffee similar to the drip coffee of the barista to be imitated. As such, the coffee drinker may enjoy the taste and aroma of the drip coffee of a specific barista by extracting drip coffee having the acidity and the concentration similar to the acidity and the concentration of the drip coffee extracted by the barista to be imitated.

As described above, in order to extract the drip coffee according to the drip coffee extraction method of the barista, it is necessary to learn the reference acidity and the reference concentration corresponding to the drip coffee of the barista to be imitated, which is the drip coffee extraction method of the barista.

To this end, the drip coffee machine 100 may include a coffee machine main body 110, an extractor 120 provided in the main body 110 and configured to extract the drip coffee corresponding to the reference acidity and the reference concentration of the drip coffee extracted by the barista to be imitated, and a sensor 130 for sensing at least one of the acidity or the concentration of the extracted drip coffee.

Specifically, the main body 110 may be formed in various shapes capable of extracting the drip coffee. For example, the main body 110 may be configured to store recipe information of each of several baristas and include a plurality of buttons to select any one of recipe information of each of several baristas to be imitated.

In addition, the main body 110 may be configured to include a water collector 121 in which water sprayed into the coffee powder is stored, a motor (not illustrated) driving the extractor 120, and a power supplier receiving power required for the overall operation of the main body 110.

The extractor 120 is a configuration of extracting the drip coffee, and specifically, may include a hopper 122 that accommodates the coffee powder, a dripper 125 which rotates clockwise or counterclockwise from the top of the hopper 122 and supplies water to the coffee powder, and a rotator 128 that controls the rotation of the dripper 125.

Specifically, the hopper 122 corresponds to a portion where the coffee powder is accommodated, and the upper side of the hopper 122 may be formed to be open so that water is supplied from the top. In addition, an extraction hole 123 may be formed below the hopper 122 so that the coffee to be extracted may be discharged. The hopper 122 is generally formed in a funnel shape in which the lower portion of the hopper 122 is narrower than the upper portion of the hopper 122 so that the liquid coffee may be easily extracted by the water supplied from the upper side.

In order to install the hopper 122 to the main body 110, the main body 110 may include a clamp (not illustrated) installed between one side of the hopper 122 and the main body 110. The clamp may be installed in the main body 110 to fix parts of the extractor 120, such as the hopper 122 and the dripper 125, in the main body 110, and may be the same as a conventional clamp configuration.

On the other hand, in the embodiment of the present disclosure, a structure in which the extractor 120 is fixed in the main body 110 by a clamp (not illustrated) is described as an example, but the embodiment of the present disclosure is not limited thereto and of course, the extractor 120 may be installed in the main body 110 in various structures.

The dripper 125 may spray water into the coffee powder when the coffee powder is accommodated in the hopper 122. In this case, the dripper 125 may spray water into the coffee powder while rotating clockwise or counterclockwise from the upper side of the hopper 122. The speed, angle, and the like at which the dripper 125 sprays water may be changed according to conditions.

In particular, the taste and aroma of the drip coffee may vary depending on the speed, the angle, and the like of spraying water from the dripper 125 into the coffee powder. Specifically, the drip coffee is known to have different taste and aroma of the drip coffee according to a condition of dripping water into the coffee powder. Accordingly, the conditions for spraying the water from the dripper 125 may be changed to extract the drip coffee having the acidity and the concentration that are the same as or/and similar to the acidity and the concentration of the drip coffee extracted by the barista to be imitated.

In order to change the conditions for spraying water from the dripper 125, the rotator 128 is installed, and specifically, the rotator 128 may adjust a rotation direction of the dripper 125, an angle of spraying water, and the like. To this end, the rotator 128 may include a rotor 127 of which one end of the dripper 125 facing the hopper 122 is installed and is rotatable, and a rotation shaft 126 supporting the rotation of the rotor 127.

Meanwhile, the extractor 120 further includes a drip tube 124 which is installed between the water collector 121 and the dripper 125 so that the water to be imitated to the water collector 121 may move to the dripper 125. In this case, the drip tube 124 is preferably implemented to be rotatable together with the dripper 125 so that the dripper 125 rotates and sprays water into the coffee powder.

At this time, preferably, the extractor 120 may further include a drive motor (not illustrated) so that the rotation shaft 126 may rotate.

The extraction process of the drip coffee through the extractor 120 is as follows.

First, the filter is mounted in the hopper 122 and then the coffee powder is added. In this case, instead of the coffee powder, a coffee bag containing the coffee powder may be put into the hopper 122.

When the coffee powder is put into the hopper 122, the water collector 121 or the dripper 125 is opened to supply water into the hopper 122. The water supplied here may be preset based on the acidity and the concentration of the drip coffee extracted by the barista to be imitated.

When the water is supplied into the hopper 122, the drive motor may be operated to rotate the rotator 128. That is, when the rotor 127 rotates by the operation of the drive motor, the dripper 125 may rotate in the same direction as the rotation direction of the rotor 127. At this time, since water is supplied through the dripper 125, the water rotates and is supplied to the coffee powder.

At this time, the rotation speed of the rotor 127 may be increased or decreased to adjust the supply speed of the water supplied to the coffee powder. In addition, since one end of the dripper 125 is installed in the rotor 127, one end of the rotor 127 capable of relative free motion is tilted to adjust the height of the dripper 125 to adjust the height of the water supplied to the coffee powder.

The speed, height, and the like of the rotor 127 may be pre-learned through a video, an image, and the like by a coffee drip method of the barista to be imitated (for example, a height of a kettle where the barista injects water into the coffee powder, a speed of injecting water into coffee powder, a speed of rotating water, etc.). After extracting the drip coffee while the rotation speed, height, and the like are pre-learned, if the acidity and the concentration of the extracted drip coffee are out of the acidity and the concentration range of the drip coffee extracted by the barista to be imitated, the height or speed of the rotor 127 may be adjusted.

Then, when the acidity and the concentration of the drip coffee extracted from the sensor 130 is within in the acidity and the concentration range of the drip coffee extracted by the barista to be imitated, the acidity and the concentration of the extracted drip coffee are stored and then when the user requests the extraction of the drip coffee, the drip coffee may be extracted based on the stored acidity and the stored concentration of the drip coffee.

The sensor 130 may sense the acidity and the concentration of the extracted drip coffee. In detail, the sensor 130 may sense the concentration or the acidity (sour taste, nutty taste, burnt taste, etc.) of the drip coffee. The sensed acidity and the sensed concentration of the drip coffee may be data for determining, by an evaluator 150 to be described below, whether the sensed acidity and the concentration of the drip coffee are out of the acidity and the concentration range of the drip coffee extracted by the barista to be imitated.

In addition, the sensor 130 may sense a temperature, an amount (volume), a speed, and the like of the water supplied to the coffee powder, when the drip coffee is extracted. The sensed temperature, amount, speed, and the like of the water supply are major factors in changing the taste and aroma of the extracted drip coffee to be measured. Subsequently, when the acidity and the concentration of the drip coffee extracted are not within the acidity and the concentration range of the drip coffee extracted by the barista to be imitated, the evaluator 150 may adjust conditions (temperature, volume, speed, etc.) of water. That is, the conditions of the water supplied to the coffee powder are changed and the changed conditions of the water are sensed by the sensor 130 to determine whether the acidity and the concentration of the drip coffee extracted are within the acidity and the concentration range of the drip coffee extracted by the barista to be imitated.

To this end, the sensor 130 may include a temperature sensor 136 for sensing the temperature of the water supplied to the hopper 122 from the dripper 125, a speed sensor 132 for measuring the supply speed of the water, and an information measuring sensor 134 for sensing the acidity and the concentration of the extracted drip coffee.

Specifically, the temperature sensor 136 may be configured by any one of a contact temperature sensor which directly contacts the water supplied to the hopper 122 to be capable of measuring the temperature of the water or a contactless temperature sensor which is mounted inside/outside the hopper 122 to be capable of measuring the temperature radiated from the water supplied to the hopper 122.

The speed sensor 132 may use a sensor using a Doppler effect such as ultrasonic waves, lasers, microwaves, and the like. The water supply speed measured by the speed sensor 132 may be data capable of determining whether a difference in taste and aroma of the extracted drip coffee occurs according to a supply speed of water to be supplied by measuring the supply speed of the water supplied to the hopper 122.

The information measuring sensor 134 may measure acidity, concentration, and the like of the extracted drip coffee. Specifically, the taste of the extracted drip coffee such as nutty, sour, and sweet may be quantified. For example, the extracted drip coffee may include amino acids such as such as asparagine, glutamine, and leucine, phenolic acids such as caffeic acid, chlorogenic acid, and quinine acid, and aliphatic acids such as acetic acid, lactic acid, citric acid, malic acid, and fumaric acid. At this time, the coffee is mostly sweet when the amino acids are rich, mostly bitter when phenolic acids are rich, and mostly sour when the aliphatic acids are rich. The acidity of the extracted drip coffee may be measured by measuring the degree of the acids included. The acidity of the drip coffee may be data for determining whether the acidity of the drip coffee extracted from the information measuring sensor 134 is within the acidity and the concentration range of the drip coffee extracted by the barista to be imitated.

When the acidity and the concentration of the extracted drip coffee are out of the range of the acidity and the concentration of the drip coffee extracted by the barista to be imitated, the drip coffee may be re-extracted by adjusting the temperature, the spray speed, the rotation speed, and the like of the water supplied to the hopper 122 from the dripper 125 of the extractor 120. By performing this process repeatedly, the acidity and the concentration of the drip coffee to be extracted may be similar to or/and the same as the acidity and the concentration of the drip coffee extracted by the barista to be imitated. As a result, the coffee drinker may drink the same and/or similar drip coffee as and/or to a drip coffee extracted by the recipe of the barista to be imitated.

Hereinafter, the drip coffee machine 100 will be described in more detail with reference to FIG. 3.

FIG. 3 is a schematic block view of the drip coffee machine according to an embodiment of the present disclosure. Hereinafter, before the description of FIG. 3, when the reference numerals of FIG. 3 and the reference numerals described with reference to FIGS. 1 and 2 are the same as each other, the detailed description will be omitted as the same configuration.

Referring to FIG. 3, the drip coffee machine 100 according to the embodiment of the present disclosure may further include a memory 160, a learner 140, an evaluator 150, and a controller 170 in addition to the extractor 120 and the sensor 130.

The memory 160 may store a computer readable program for determining whether the acidity and the concentration of the drip coffee are within a predetermined range of the acidity and the concentration of the drip coffee extracted by the barista to be imitated. Specifically, the memory 160 may store a machine learning model for extracting drip coffee within a predetermined range from the acidity and the concentration of the drip coffee extracted by the barista to be imitated.

In this case, the predetermined range from the acidity and the concentration of the drip coffee extracted by the barista to be imitated means a degree enough not for the drinker to recognize a difference in taste and aroma between the drip coffee extracted from the drip coffee machine and the drip coffee extracted by the barista to be imitated, and may be changed numerically according to the requirements.

The memory 160 records and stores barista recipe information and may include a volatile or nonvolatile recording medium. The recording medium is configured to store data readable by the controller 170, and may include a hard disk drive (HDD), solid state disk (SSD), silicon disk drive (SDD), ROM, RAM, CD-ROM, a magnetic tape, a floppy disk, a light data storage device, and the like. In the present embodiment, the information stored in the memory 160 will be described for each situation according to the context.

In particular, the acidity and the concentration of the drip coffee extracted by the barista to be imitated in the memory 160 may be provided by a database server 180 required to apply an AI algorithm.

The reference acidity and the reference concentration corresponding to the drip coffee of the barista to be imitated stored in the memory 160 may be learned by the learner 140, and the drip coffee may be extracted based on the learned information.

That is, the learner 140 learns the acidity and the concentration of the drip coffee which is the same and/or similar drip coffee as and/or to the machine learning model for extracting the drip coffee stored in the memory 160.

As described above, the server 180 may provide big data and data about recipes. In addition, the server 180 may include a web server or an application that may remotely control the drip coffee machine 100 by a communicator (not illustrated) that communicates with an application or a web browser installed in the drip coffee machine 100.

Artificial intelligence (AI) is an area of computer engineering science and information technology that studies methods to make computers mimic intelligent human behaviors such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed Specifically, the Machine Learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. The CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

Meanwhile, the drip coffee machine 100 of the embodiment of the present disclosure may be equipped with an artificial neural network to perform the drip coffee extraction based on the machine learning using the inputted reference acidity and reference concentration as input data.

When the drip coffee is extracted, the evaluator 150 may evaluate whether the digitized acidity and the digitized concentration of the drip coffee are out of the acidity and concentration range of the drip coffee extracted by the barista to be imitated.

When the acidity and the concentration of the extracted drip coffee evaluated by the evaluator 150 are out of the range of the acidity and concentration of the drip coffee extracted by the barista to be imitated, the controller 170 may control the extractor 120 extracting the drip coffee by changing conditions (a supply speed, a temperature, an amount, etc. of water supplied to coffee powder from the dripper 125) for extracting the drip coffee.

That is, according to the above embodiment, the acidity and the concentration of the drip coffee may be changed by adjusting the supply speed of the water supplied to the coffee powder from the dripper 125, or by adjusting the amount of water, the temperature of the water, and the rotation speed of the dripper 125 rotating when the water is supplied. Therefore, when the acidity and the concentration of the extracted drip coffee are out of the acidity and concentration range of the drip coffee extracted by the barista to be imitated, the drip coffee may be re-extracted by changing conditions for extracting the drip coffee.

At this time, when the acidity and the concentration of the drip coffee extracted or re-extracted are within the acidity and the concentration range of the drip coffee extracted by the barista to be imitated, conditions of the extractor 120 of extracting the acidity and the concentration of the drip coffee re-extracted are stored and then the drip coffee may be extracted based on the stored conditions when the drinker requests the drip coffee extraction.

The controller 170 may include an artificial neural network, for example, a deep neural network (DNN) such as a CNN, an RNN, or a DBN, and may learn a deep neural network. Both unsupervised learning and supervised learning may be used as a machine learning method of the artificial neural network. After the learning according to the setting, the controller 170 may control the conditions of the drip coffee extracted by the extractor 120 to be updated so that the drip coffee extracted from the drip coffee machine 100 is the same as or/and similar to the drip coffee extracted by the recipe of the barista to be imitated.

In addition, the controller 170 is a kind of central processor that drives control software mounted in the memory 160 and controls the sensor 130 and/or the extractor 120 to extract the drip coffee similar to and/or the same as the drip coffee based on the reference acidity and the reference concentration.

Herein, the controller 170 may include all kinds of devices capable of processing data, such as a processor. Here, 'the processor' may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

Thus, the same or/and similar drip coffee as or/and to the drip coffee extracted by the barista may be extracted by the drip coffee machine 100. Therefore, the drinker may drink drip coffee extracted according to a drip coffee recipe of a barista.

Further, the drinker may drink drip coffee extracted by the barista using the drip coffee machine 100 that has learned a drip coffee recipe of the barista without asking the barista to extract coffee directly or visiting the barista.

FIG. 4 is a block diagram for describing an operation of the drip coffee machine according to an embodiment of the present disclosure. Hereinafter, a description of components that are identical to the components described with reference to FIGS. 1 to 3 will be omitted.

Referring to FIG. 4, in an operation of the drip coffee machine 100 according to an embodiment of the present disclosure, first, the information about acidity and concentration of the drip coffee extracted by the barista to be imitated may be collected by the database server 180 (S110).

Here, the reference acidity and the reference concentration to be imitated may be referred to as the acidity and the concentration of the drip coffee extracted by any one of the baristas who have won awards in various barista competitions. Unlike this, the user directly may select a specific barista, and the reference acidity and the reference concentration may be referred to as the acidity and the concentration of the drip coffee extracted by the barista selected by the user in the database server 180.

By collecting the acidity and the concentration of the drip coffee extracted by the barista to be imitated, it may learn the collected acidity and the collected concentration (S120). That is, data in which the concentration, acidity, etc. of the drip coffee extracted by the selected barista are digitized may be learned.

By learning the acidity and the concentration of the drip coffee extracted by the barista to be imitated, it may extract the drip coffee based on the learned information (S130). In this case, the extracted drip coffee may be referred to as drip coffee implemented with the acidity and concentration similar to and/or the same as those of the drip coffee extracted by the barista based on the acidity and the concentration of the drip coffee extracted by the learned barista.

The acidity and the concentration of the extracted drip coffee may be compared with the acidity and the concentration of the drip coffee extracted by the barista to be imitated. To this end, the acidity and concentration of the extracted drip coffee may be collected (S140).

By collecting the acidity and the concentration of the extracted drip coffee, it may compare and evaluate whether the collected acidity and the collected concentration of the drip coffee are within a predetermined range from the acidity and the concentration of the drip coffee extracted by the barista to be imitated (S150). Specifically, it may evaluate whether the acidity and the concentration of the extracted drip coffee are out of a range of the reference acidity and the reference concentration corresponding to the drip coffee of the barista to be imitated. In this case, the information such as acidity and concentration may be digitized for more accurate comparison and evaluation, and when the acidity and the concentration of the extracted drip coffee are within in the range of the reference acidity and the reference concentration corresponding to the drip coffee of the barista to be imitated, the extracted drip coffee may be referred to as drip coffee the same as or/and similar to the drip coffee extracted by the barista.

On the contrary, if the acidity and the concentration of the extracted drip coffee are out of the range of the acidity and concentration of the drip coffee extracted by the barista to be imitated, it is determined that the drip coffee does not match the drip coffee to be imitated, conditions of extracting the coffee are changed, and then the coffee may be re-extracted (S160). Specifically, when the drip coffee is extracted, it may change a temperature and an amount of the water supplied to the coffee powder, a supply speed of the water supplied toward the coffee powder, and the like. This is because the taste and aroma of the drip coffee vary depending on the conditions of the water supplied to the coffee powder.

Thereafter, the acidity and the concentration may be recollected from the re-extracted drip coffee. As described above, it is determined whether the acidity and the concentration of the extracted drip coffee are within the range of the acidity and the concentration of the drip coffee extracted by the barista to be imitated. Therefore, it is to determine whether the acidity and the concentration of the re-extracted drip coffee are also within the range of the acidity and the concentration of the drip coffee extracted by the barista to be imitated.

At this time, when the acidity and the concentration of the re-extracted drip coffee are out of the range of the acidity and the concentration of the drip coffee extracted by the barista to be imitated, the coffee may be re-extracted by changing conditions (for example, conditions for supplying the water to the coffee powder in the dripper 125) for extracting the drip coffee.

Unlike this, when the acidity and the concentration of the extracted drip coffee are within the range of the acidity and concentration of the drip coffee extracted by the barista to be imitated, the acidity and the concentration of the extracted drip coffee may be stored in the memory 160 (S170). The stored acidity and the stored concentration of the extracted drip coffee may be used as recipe information of the drip coffee for drip coffee extraction in the drip coffee machine 100.

FIG. 5 is an exemplary diagram for describing an operation of the drip coffee machine according to an embodiment of the present disclosure. Hereinafter, a description of components that are identical to the components described with reference to FIGS. 1 to 4 will be omitted.

Referring to FIG. 5, when the drip coffee is extracted (Environment), it may be calculated how much the acidity and the concentration of the extracted drip coffee correspond to the reference acidity and the reference concentration corresponding to the drip coffee of the barista to be imitated (State, Reward).

To this end, the acidity and the concentration of the drip coffee may be digitized. In detail, based on water without acidity, the higher the acidity, −1 is given and on the contrary, the lower the acidity, +1 is given. Similarly, the higher the concentration, +1 is given, and the lower the concentration, −1 may be given. In this case, if the acidity and the concentration of the drip coffee extracted by the barista are respectively +1, 0, the acidity and the concentration of the drip coffee extracted by the drip coffee machine 100 may be lower in acidity and higher in concentration than the drip coffee extracted by the barista. In this case, the acidity and the concentration of the drip coffee extracted from the drip coffee machine 100 are digitized (for example, +5) so that the difference between the drip coffee extracted by the barista and the drip coffee extracted by the drip coffee machine 100 may be specifically compared.

In this way, the calculated acidity and the calculated concentration of the drip coffee may be reinforced-learned (RL Agent). Specifically, if the acidity and the concentration of the extracted drip coffee are not within the range of the acidity and concentration of the drip coffee extracted by the barista to be imitated, the drip coffee may be extracted at the acidity and the concentration similar to and/or the same as the acidity and the concentration of the drip coffee extracted by the barista to be imitated. To this end, a height of the dripper 125 for supplying water to the coffee powder, a speed of injecting water, and the like may be adjusted in the extractor 120 for extracting the drip coffee.

When learning is made, conditions of the extractor 120 may be selected to extract the drip coffee at the acidity and the concentration similar to and/or the same as the acidity and the concentration of the drip coffee extracted by the barista to be imitated (Action).

For example, in the reinforcement learning step (RL Agent), according to Example 1, when a temperature of the water is 100 degrees, an amount of water is 200 ml, a speed of supplying water to the coffee powder is 3 m/s, and an angular velocity of the dripper for supplying water based on the rotation shaft 126 is 0 degree/s, the acidity and the concentration of the extracted drip coffee may be collected.

Unlike this, according to Example 2, when a temperature of the water is 95 degrees, an amount of water is 150 ml, a speed of supplying water to the coffee powder is 5 m/s, a direction for supplying water is outward, and an angular velocity of the dripper 125 for supplying water based on the rotation shaft 126 is 10 degrees/s, the acidity and the concentration of the drip coffee may be collected.

Further, according to Example 3, when a temperature of the water is 97 degrees, an amount of water is 170 ml, a speed of supplying water to the coffee powder is 7 m/s, and an angular velocity of the dripper 125 for supplying water based on spiral rotation and the rotation shaft 126 is 15 degrees/s, the acidity and the concentration of the extracted drip coffee may be collected.

The Example in which the acidity and the concentration of the drip coffee extracted by each Example are within a predetermined range from the acidity and the concentration of the drip coffee extracted by the barista to be imitated may be a condition in which the drip coffee may be extracted at the acidity and the concentration similar to and/or the same as the acidity and the concentration of the drip coffee extracted by the barista to be imitated.

FIG. 6 is a flowchart for describing an operation of the drip coffee machine according to an embodiment of the present disclosure. Hereinafter, a description of components that are identical to the components described with reference to FIGS. 1 to 5 will be omitted.

Referring to FIG. 6, first, a barista to be imitated may be selected (S110). Here, the barista to be imitated may be any one of the baristas who have won awards in various barista competitions, and may be a barista selected by a drinker or any conditions.

Thereafter, the drip coffee may be extracted based on the acidity and the concentration of the drip coffee extracted by the barista to be imitated (S120). That is, the drip coffee is extracted by the drip coffee machine while learning the acidity and the concentration of the drip coffee extracted by the barista to be imitated.

Thereafter, the concentration and the acidity of the extracted drip coffee may be sensed (S130). The concentration and the acidity of the drip coffee may be sensed by a plurality of sensors mounted in the drip coffee machine 100.

When the concentration and the acidity of the drip coffee are sensed, it may determine whether the concentration and the acidity of the drip coffee are within a range of the reference acidity and the reference concentration of the drip coffee extracted by the barista to be imitated (S140).

That is, it is numerically determined whether the taste and aroma of the extracted drip coffee are the same as and/or similar to the taste and aroma of the drip coffee extracted by the barista to be imitated.

At this time, when the concentration and the acidity of the drip coffee are out of the range of the reference acidity and the reference concentration of the drip coffee extracted by the barista to be imitated, the drip coffee may be re-extracted by changing manufacturing parameters in the recipe information of the barista (S150).

In detail, the manufacturing parameters in the recipe information of the barista may be conditions of supplying water to the coffee powder from the extractor 120 from which the drip coffee is extracted. For example, the manufacturing parameters may be a temperature of water, an amount of water, a speed of supplying water to the coffee powder, a direction (clockwise or counterclockwise) of supplying water, an angular velocity of the dripper 125 supplying water based on the rotation shaft 126, and so on.

Alternatively, when the concentration and the acidity of the drip coffee are within the range of the reference acidity and the reference concentration of the drip coffee extracted by the barista to be imitated, the drip coffee may be extracted according to the recipe of the extracted drip coffee (S160).

Through this process, it may extract drip coffee that matches the recipe, acidity and concentration of the drip coffee of the barista to be imitated.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of the computer program may include not only machine language codes generated by compilers but also high-level language codes that can be executed by computers using interpreters.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for extracting coffee by a coffee machine, the method comprising:
    receiving a user input selecting a barista;
    extracting, by an extractor, coffee according to recipe information corresponding to the selected barista;
    sensing, by a sensor, at least one of acidity or concentration of the extracted coffee;
    determining whether the sensed at least one of the acidity or the concentration of the extracted coffee is within a predetermined range of a reference acidity or a reference concentration of coffee corresponding to the recipe information; and
    changing extracting parameters for the respective recipe information based on a machine learning model when the sensed at least one of the acidity or the concentration of the extracted coffee is respectively out of the predetermined range of the reference acidity or the reference concentration,
    wherein the machine learning model is pre-trained to predict an effect of a change in the extracting parameters included for the recipe information on the at least one of the acidity or the concentration of the extracted coffee,
    wherein the sensing comprises: measuring the at least one of the acidity or the concentration of the extracted coffee; and digitizing the measured at least one of the acidity or the concentration of the extracted coffee such that a numeric value is assigned to the extracted coffee, causing reinforcement learning by the machine learning model based on the assigned numeric value.

2. The method of claim 1, further comprising supplying water to coffee bean powder used for extracting the coffee,
    wherein at least one extracting parameter, among a water supply speed, a temperature of the water, an amount of the water, and a spray angle of the water sprayed toward the coffee bean powder, is changed according to the changed extracting parameters for the recipe information.

3. The method of claim 2, further comprising:
    re-extracting the coffee according to the at least one extracting parameter changed based on the changed extracting parameters for the recipe information.

4. The method of claim 1, further comprising:
    storing a specific method for extracting the coffee when the at least one of the acidity or the concentration of the extracted coffee is respectively determined to be within the reference acidity or the reference concentration of the coffee corresponding to the recipe information.

* * * * *